W. A. BONNELL.
OUTLET BOX.
APPLICATION FILED DEC. 24, 1914.
1,243,246.
Patented Oct. 16, 1917.
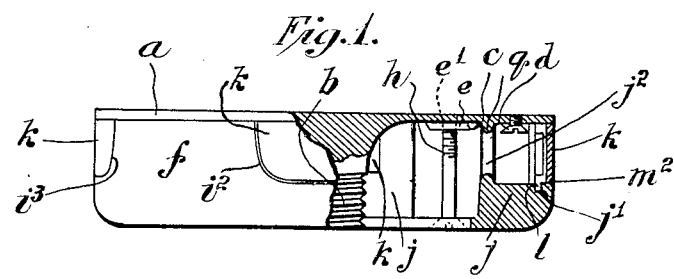
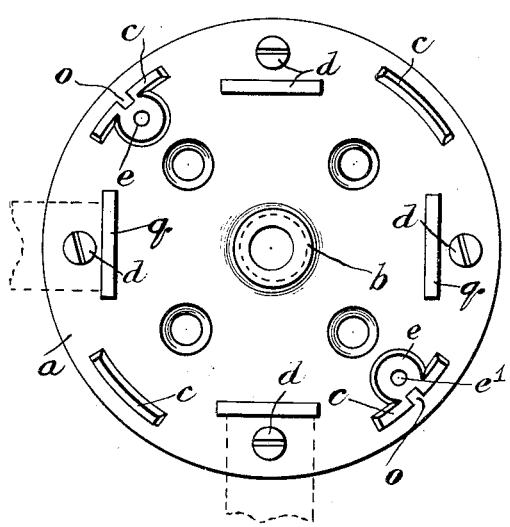
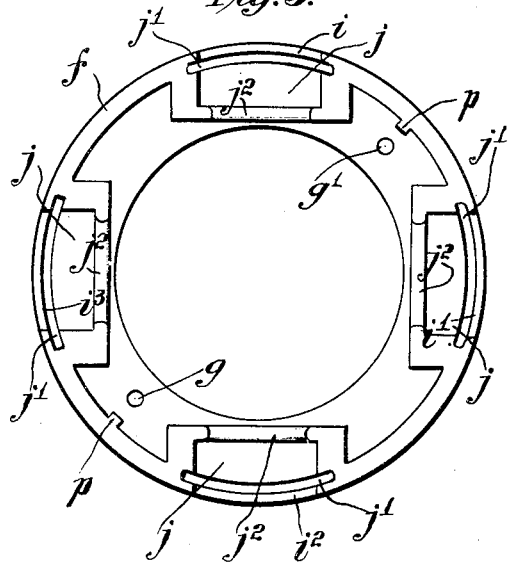
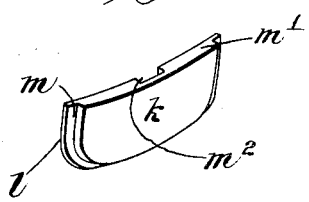
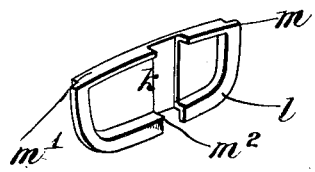
Attest:
Inventor:
William A. Bonnell,
by Fred'k C. Fischer, Atty

UNITED STATES PATENT OFFICE.

WILLIAM A. BONNELL, OF BROOKLYN, NEW YORK.

OUTLET-BOX.

1,243,246. Specification of Letters Patent. Patented Oct. 16, 1917.

Application filed December 24, 1914. Serial No. 878,909.

*To all whom it may concern:*

Be it known that I, WILLIAM A. BONNELL, a citizen of the United States, residing at the borough of Brooklyn, in the city of New York, county of Kings, and State of New York, have invented certain new and useful Improvements in Outlet-Boxes, of which the following is a specification, reference being had therein to the accompanying drawings, which form a part thereof.

My invention relates to outlet boxes and more particularly to a type thereof provided with conduit openings normally closed by means of removable plates, known as knock-outs.

In the type of outlet boxes to which my invention relates, it is a common practice to provide the conduit end with a bushing, mounted in the opening of the outlet box from which the knock-out has been removed, or in some instances in the conduit itself. Various types of bushings have been employed, but in almost all outlet boxes, such bushings are employed and are considered necessary to avoid the abrasion of the conductor wires and a resultant possibility of short-circuiting through the box. Furthermore, in those outlet boxes most commonly used, the knock-outs are made integrally with the wall of the box, the structure of said walls about the knock-outs being weakened, or disks punched from the metal of the sides of the box, are re-inserted in the openings thus formed and secured in position by means of a highly frangible binder.

In another type of knock-out box in which the walls are split horizontally, the walls are provided with openings having a channeled seat adapted to receive the edges of a disk inserted therein, the disks being removed by separating the two parts of the box.

With these conditions in mind, I have produced an outlet box composed of a wall plate and a box-like cap therefor having in the side wall thereof a plurality of conduit openings normally closed by means of frangible plates or knock-outs, the tops of which are substantially flush with the edge of the box so as to abut against and be held in position by the wall plate. By this construction a box may be handled by the workman in the usual manner as to the removal of the knock-outs; and in the event of a necessity for changing the direction of the conduit line, the cap may be removed and the plate or knock-out in one opening changed to another opening. This interchangeability of the plates, or knock-outs, with relation to the several conduit openings in a box, permits the correction of any mistakes in the preparation of the box without leaving openings in the side wall of the box or requiring the substitution of a new box for the one improperly prepared.

I also so construct the cap as to provide integrally therewith a shoulder against which the end of the conduit is adapted to abut, said shoulder being so rounded off as to present no sharp edges which would have a tendency to abrade the insulation upon the conductor. This shoulder in addition to serving the same purposes as the ordinary bushing, will define the extent of projection of the conduit within the cap and thus permit the production of a box wherein the capacity within the box for the storage of the terminal wires may be determined in the manufacture of the box, and cannot be restricted by the workman in mounting the conduit in relation to the box. I also preferably provide the wall plate with a rounded flange adjacent each conduit opening in the cap and and projecting thereinto. The conduit itself is in electrical connection with the box, a binder screw being ordinarily employed to insure the desired electrical contact.

An outlet box made in accordance with my invention presents an outer surface free of obstructions, the plates or knockouts being so constructed as to come substantially flush with the outer side wall of the cap. While these plates or knock-outs may be removed from the conduit openings by separating the cap from the wall plate, I preferably so weaken the material of the knock-outs, that they may be readily fractured by means of the ordinary hand tool used in removing knock-outs. The increased thickness of the metal of the cap adjacent each conduit opening due to the presence of the integral shoulder forming the bushing, gives sufficient strength to the box adjacent the opening, to prevent the fracture thereof in removing a knock-out.

The invention consists primarily in an outlet box embodying therein a body comprising two separable sections having in the side wall thereof a plurality of similar conduit openings, the said side wall adjacent said opening being provided with inwardly presented projections forming shoulders about and within the edge of said conduit openings, said projections being rounded on the inner edge thereof whereby bushings are formed integrally with said box wall; closure plates or knock-outs adapted to normally close said conduit openings and means connecting the sections of said box body; and in such other novel features of construction and combination of parts as are hereinafter set forth and described and more particularly pointed out in the claims hereto appended.

Referring to the drawings:

Figure 1 is a side view of an outlet box embodying my invention, said box being shown partly in vertical section;

Fig. 2 is a bottom plan view of the wall plate;

Fig. 3 is a top plan view of the cap section of the box;

Fig. 4 is a view in perspective of the front of one of the closure plates or knock-outs; and Fig. 5 is a similar view of the back of said plate or knock-out.

Like letters refer to like parts throughout the several views.

In the embodiment of my invention shown in the drawings, the box body is shown as composed of two separable sections, a wall plate $a$ and a cap section $f$. The plate $a$ is provided with an exteriorly screw threaded nipple $b$ adapted to have an electrical fixture mounted thereon. Formed integrally with the wall plate $a$ are a plurality of segmental beads $c$ set in slightly from the edge of said plate. These beads are for the purpose of insuring the proper positioning of the cap section with relation to said plate. I also provide said plate with a plurality of contact screws $d$ which are adapted to project into the several conduit openings, these screws being carried by the said plate adjacent the edge thereof in a position where they may be readily engaged by the recess in the end of the conduit which is provided for the purpose of facilitating the connection of the conduit to the outlet box without the necessity of exposing the screw through the removal of the cap section. I also provide the plate $a$ with bushings $e$ having screw threaded openings therein.

The wall plate $a$ is provided with a plurality of screw holes to facilitate its attachment to the wall or ceiling of a room.

The cap section $f$ is preferably a cup-like casing having an enlarged opening in the bottom thereof. This opening is concentric with the nipple $b$ and is of a diameter sufficiently great to permit the convenient handling of the terminal wires leading from the conduits, while at the same time presenting sufficient overhang to afford ample storage space within the casing for the excess length of terminal wires. The opening in the bottom of the cap $f$ also affords means of convenient access to the central portion of the plate $a$ for the purpose of attaching the box by means of said plate to the wall or ceiling of a room.

The bottom of said cap is provided with screw openings $g$—$g'$ through which screws $h$ pass, said screws being connected with the screw threads in the bushings $e$ respectively. Said screws serve to connect the two sections of the box while permitting their separation for the purpose of changing the knock-out from one conduit opening to another when it is necessary to do so to correct a mistake in preparing the box for use.

The upper part of the cap section $f$ is recessed to form a plurality of conduit openings in the side wall thereof. In the form of the invention shown, four such openings $i$—$i'$—$i^2$—$i^3$ are provided, the center of said openings being arranged 90° apart so as to permit the running of a straight line of conduit or the running of a line having a right angular bend therein. The top edge of the cap $f$ is finished off flat so as to abut squarely against the face of the wall plate $a$ thus closing said recesses at the top thereof when the cap is mounted upon the said wall plate.

The wall of the cap section $f$ is thickened at $j$ adjacent each recess $i$ to $i^3$, said thickened portion being provided with a groove or channel $j'$ and with a projection $j^2$ forming a shoulder extending about the conduit opening within the cap section. This shoulder $j^2$ projects into the said opening to an extent to present a shoulder against which the end of the conduit after passing through said opening is adapted to abut. The said shoulder $j^2$ forms a chord of a segment of the circular wall of its cap so as to avoid the necessity for curving the end of the conduit.

The said projection $j^2$ is preferably cast integrally with the cap $f$ and the edges thereof are so rounded as to avoid any angularity thereof which would tend to abrade the insulation of a wire being drawn thereover from, or to, the conduit.

The said conduit openings $i$ to $i^3$ are normally closed by means of knock-out plates $k$ preferably of cast metal. The inner edge of each of these plates is provided at all points thereof, excepting the top, with a flange $l$ of a thickness adapted to enter the channel $j'$; and with a recess centrally of the inner face thereof forming a rim $m$ about the edge thereof. This reinforcing rim $m$, as well as the plate itself, is weakened centrally thereof as at $m^2$ so as to make the plate or knock-out highly frangible and thus relieve the portion $j$ of the cap $f$ from undue shocks when the knock-out is removed by the impact of a tool therewith. The top $m'$ of said plate or knock-out $k$ is finished off flat, the dimensions of said plate or knock-out being such that this top will come substantially flush with the top edge of the cap section or casing $f$. By this construction each plate or knock-out $k$ will, when the box is assembled, bear upon the face of the wall plate $a$ and be held in position thereby with a flange $l$ thereof in the channel $j'$.

The wall plate $a$ and the cap member $f$ are provided with coöperating tongues and grooves $o$—$p$ for insuring accuracy in the positioning of these parts and preventing a rotative movement of one relative to the other when the parts have been brought together.

I also preferably provide the wall plate $a$ with a straight bead or fillet $q$ preferably having a rounded top adapted to be alined with and fit within the shoulder $j^2$ and coöperate therewith in forming a substantially continuous shoulder, having the function of a bushing against which the end of the conduit is adapted to abut when it is in position with relation to the outlet box. Not only do this shoulder $j^2$ and bead $q$ act as a bushing, but also as a stop against which the conduit is adapted to be thrust to limit the extent of projection of the conduit into the outlet box and thus avoid any restriction of the capacity of this box by reason of the conduits extending too far thereinto.

An outlet box made in accordance with my invention is assembled in its entirety with all the conduit openings $i$ to $i^3$ closed by means of closure plates or knock-outs $k$, the cap section $f$ being secured to the plate $a$ by means of the screws $h$.

In running a new line of conduits, the box is prepared by removing the desired closure plates or knock-out $k$. This is usually done by merely striking the plate or knock-out with a hand tool, the weakened portion $m^2$ thereof permitting the ready fracture of the plate and relieving the wall of the section $f$ from such shocks as would tend to fracture same. The increase in the thickness of the wall of the said cap about the conduit openings so reinforces the said wall, however, as to reduce the possibility of a fracture of the said cap to a minimum.

When installing the conduit, the end thereof is merely thrust through the desired opening $i$—$i'$—$i^2$—$i^3$ from which the knock-out has been removed, this end abutting against the shoulder $j^2$ and the bead $q$, said end being within the edge of said shoulder and bead so that the said shoulder and bead will project slightly across the end of the conduit and hold the wires out of contact with the bur caused by cutting the conduit. The edge of the conduit is provided with a recess or notch which takes under the head of a clamp screw $d$ and forces the conduit into the desired electrical contact with the plate $a$.

If it be found that through mistake a wrong knock-out has been removed, this mistake may be corrected by removing the cap $f$ and changing a knock-out $k$ in another opening in said box to the conduit opening from which the knock-out was improperly removed, the cap then being replaced. By so doing, no unsealed conduit openings remain in the box, after a mistake has been rectified.

It will be observed that an outlet box made in accordance with my invention is so constructed that any closure plate or knock-out $k$ may be readily removed without separating the two box sections and that the said plates or knock-outs are carried in their entirety by one of these sections, being merely held in place by the flat edge bearing against the flat surface of the other section thus greatly facilitating the assembling of the device during manufacture or when in use.

It is not my intention to limit the invention to the precise details of construction shown in the accompanying drawings, it being apparent that such may be varied without departing from the spirit and scope of the invention.

Having described the invention, what I claim as new and desire to have protected by Letters Patent is:—

1. An outlet box embodying therein a body comprising two separable sections having in the side wall thereof a plurality of similar conduit openings, a shoulder within and spaced away from said side wall and extending about each of said openings, said shoulder being rounded on the inner edge thereof whereby bushings integral with said sections are formed, each of said openings having a channel extending about the wall thereof, a closure plate or knock-out having a projecting flange thereabout adapted to enter said channel, said closure plates or knock-outs being adapted to normally close said conduit openings respectively, said closure plates or knock-outs respectively being weakened to make them more frangible and means detachably connecting the sections of said body.

2. An outlet box embodying therein a body comprising a wall plate, and a cup like cap inclosing one face thereof, said cap having in the side wall thereof a plurality of similar conduit openings, a shoulder within and spaced away from the wall of said cap, and extending about each of said openings, said shoulder being rounded on the inner edge thereof, beads or fillets carried by said wall plate and adapted when the box is assembled to be alined with said shoulders respectively and form therewith continuous bushings integral with said body, the wall of each of said openings having a channel extending thereabout, closure plates or knock-outs adapted to normally close each of said conduits and to be engaged by said wall plate, said closure plates or knock-outs each having a flange adapted to seat in said channel and being weakened to make them more frangible and means detachably connecting said cap and said wall plate.

3. An outlet box embodying therein a body comprising a wall plate having a pendant screw threaded nipple adapted to receive an electrical fixture and a cap inclosing one face of said plate, said cap having an opening concentric with, and of greater dimensions than said nipple and having a plurality of conduit openings through the side thereof, a shoulder within and spaced away from the wall of said cap and extending about each of said openings, said shoulder being rounded on the inner edge thereof, a bead or fillet carried by said wall plate adapted to be alined with said shoulder whereby a continuous bushing integral with said box body is formed, closure plates or knock-outs adapted respectively to normally close said conduit openings, and to engage said wall plate and means detachably connecting said cap with said wall plate.

4. An outlet box embodying therein a body comprising a wall plate having a pendant screw threaded nipple adapted to receive an electrical fixture and a cap inclosing one face of said plate, said cap having an opening concentric with, and of greater dimensions than, said nipple and having a plurality of conduit openings through the side thereof, a shoulder within and spaced away from the wall of said cap and extending about each of said openings, said shoulder being rounded on the inner edge thereof, a bead or fillet carried by said wall plate adapted to be alined with said shoulder whereby a continuous bushing integral with said box body is formed, closure plates or knock-outs adapted respectively to normally close said conduit openings and to engage said wall plate, clamp screws carried by said wall plate between said beads and fillets and the edge of said plate, said clamp screws being adapted to be received by a recess in the end of a conduit, coöperating lugs or sockets carried by said wall plate and the upper edge of said cap whereby said parts will be accurately positioned and means detachably connecting said cap to said wall plate.

In witness whereof I hereunto affix my signature in the presence of two subscribing witnesses, this 15th day of December 1914.

WILLIAM A. BONNELL.

Witnesses:
FREDK. C. FISCHER,
CLIFFORD A. ALLISTON.